April 2, 1957 — I. B. BATES — 2,787,163
CONNECTING ROD CONSTRUCTION
Filed March 15, 1954
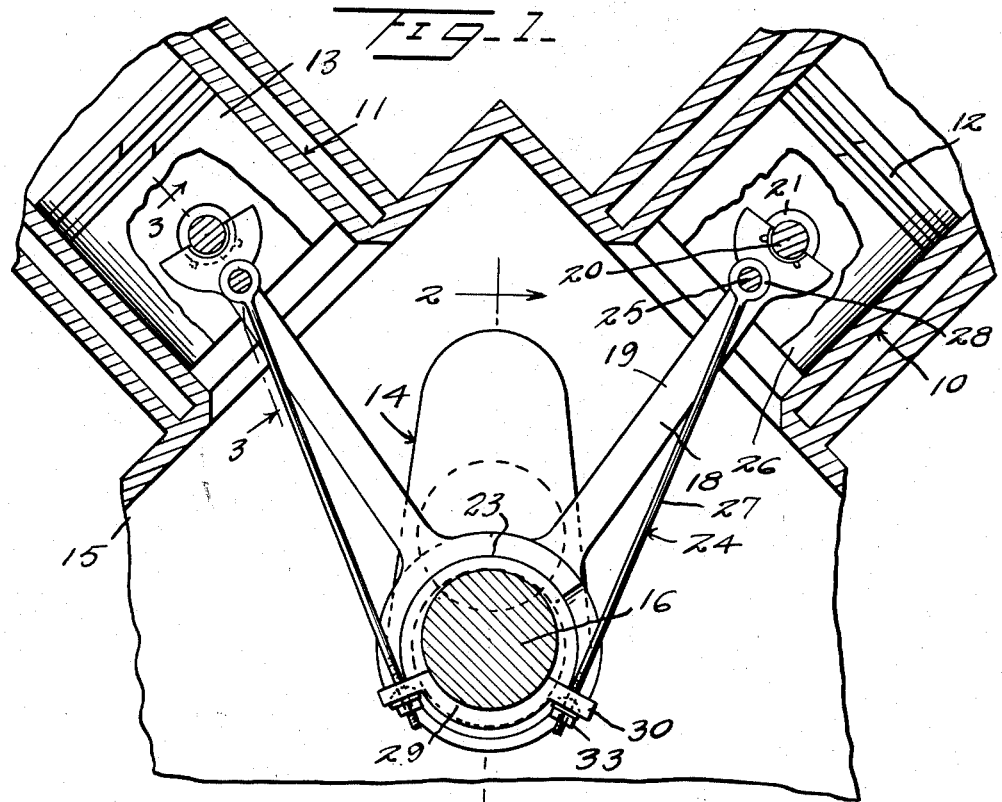
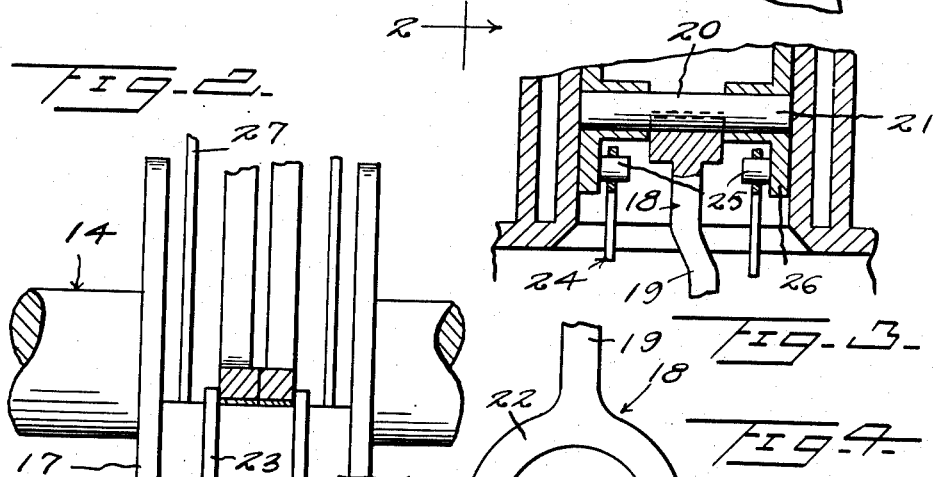
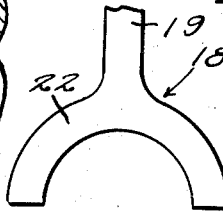
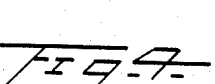
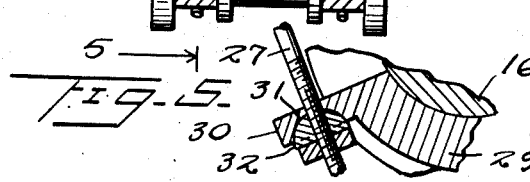
INVENTOR
I. B. Bates
BY Kimmel & Crowell
ATTORNEYS

United States Patent Office 2,787,163
Patented Apr. 2, 1957

2,787,163

CONNECTING ROD CONSTRUCTION

Inman B. Bates, Los Angeles, Calif.

Application March 15, 1954, Serial No. 416,314

4 Claims. (Cl. 74—44)

This invention relates to internal combustion engines, and more particularly to an improved connecting rod construction.

In engines of the V-type the cylinders are arranged in two banks with the axes at substantially right angles, and the connecting rod of one cylinder of one bank is connected with the same crank offset as the connecting rod of a cylinder of the other bank. It is conventional to provide a bearing bushing or barrel at the outer end of each connecting rod through which the wrist pin engages, and the inner end of each connecting rod has a removable cap bearing. An object of this invention is to provide an improved connecting rod construction wherein the bearing surfaces are semi-cylindrical, and the piston is connected to the crank offset by means of a pair of tie rods.

Another object of this invention is to provide a connecting rod construction which will permit taking up wear without removal of shims or the like.

A further object of this invention is to provide a connecting rod assembly wherein the connecting rods may be removed and replaced without removal of the piston or head of the engine.

With the above and other objects in view, my invention consists in the arrangement, combination and details of construction disclosed in the drawing and specification, and then more particularly pointed out in the appended claims.

In the drawing:

Figure 1 is a fragmentary vertical section of a V-type internal combustion engine having a connecting rod assembly constructed according to an embodiment of this invention.

Figure 2 is a fragmentary sectional view taken on the line 2—2 of Figure 1.

Figure 3 is a fragmentary sectional view taken on the line 3—3 of Figure 1.

Figure 4 is a fragmentary side elevation of one end of a connecting rod.

Figure 5 is a fragmentary sectional view taken on the line 5—5 of Figure 2.

Referring to the drawing, the numerals 10 and 11 designate generally angularly related cylinders disposed in substantially right angular position with pistons 12 and 13 slidable in the cylinders 10 and 11. It will be understood that conventional intake and exhaust valves will be associated with the engine herein disclosed.

A crank shaft, generally indicated at 14, is rotatably carried by the crank case 15 and includes a crank offset 16 disposed between a pair of crank arms 17. A connecting rod, generally indicated at 18, is disposed between each piston and crank offset, and each connecting rod 18 is formed of a elongated shank 19 having a semi-circular bearing boss 20 at one end within which the wrist pin 21 of a piston is adapted to engage.

The opposite end of each connecting rod 18 is provided with a second semi-circular bearing boss 22 which engages about the crank pin or offset 16. The crank pin or offset 16 is provided with a pair of angular ribs or flanges 23 between which an adjacent pair of bearing members 22 are adapted to engage.

In order to provide a means whereby the pistons will be moved back and forth with rotation of crank shaft 14, I have provided a pair of tie rods, generally indicated at 24, which are connected between each piston 12 and the crank offset 16. Each piston 12 is provided with an opposed pair of inwardly projecting studs 25 which extend from the skirt 26 of each piston, and each tie rod 24, which is formed of an elongated shank 27 and an eye 28 has the eye thereof loosely engaged about a stud 25.

A partly circular bearing cap 29 engages between one flange or rib 23 and an adjacent hanger arm 17, and the bearing member 29 is provided with a pair of downwardly divergent ears 30. The shank 27 of tie rod 24 loosely engages through the ears 30, and each ear 30 is formed with a partly spherical bearing surface 31 within which a partly circular washer 32 rockably engages.

A nut 33 is threaded on the lower end of each tie rod 24 and provides a means whereby any wear may be easily and quickly taken up.

With a connecting rod assembly as hereinbefore described, the connecting rods can be easily and quickly removed from the crank shaft and pistons by unthreading nut 33 on the lower end of a tie rod and removing tie rod 24 from the bearing 29. As seen in Figure 2, each bearing 29 has a pair of tie rods 24 connected with the ears thereof, and there will be two tie rods for each piston and connecting rod.

The tie rods 24 are disposed in upwardly divergent relation as shown in Figure 1.

When the tie rods 24 have been uncoupled from the lower bearing cap 29, the tie rods may be slipped from the studs 25 and the connecting rods can then be easily removed and taken through the bottom of the crank case thereby making it unnecessary to remove the head of each bank of cylinders in order to replace or work on one or more of the connecting rods.

What is claimed is:

1. In an internal combustion engine having angularly related banks of cylinders with a common crank shaft and a piston slidable in each cylinder, a connecting rod between each piston and crank offset, said connecting rod being formed of a shank and a semi-circular bearing member at each end of said shank, a partly circular bearing cap engaging the crank offset, and a pair of tie rods connected between said bearing cap and associated pairs of pistons.

2. In an internal combustion engine having angularly related banks of cylinders with a common crank shaft and a piston slidable in each cylinder, a connecting rod between each piston and crank offset, said connecting rod comprising an elongated shank and a semi-circular bearing at each end thereof, and means connected between adjacent pairs of pistons and said crank offset for holding said pistons against endwise movement relative to said connecting rods.

3. In an internal combustion engine having angularly related banks of cylinders with a common crank shaft and a piston slidable in each cylinder, a connecting rod between each piston and crank offset, said connecting rod comprising an elongated shank and a semi-circular bearing at each end thereof, a pair of partly circular bearing caps engaging said crank offset on the outer ends of said connecting rod bearings, and divergently related pairs of tie rods connected between said piston studs and said bearing caps.

4. In an internal combustion engine having angularly related banks of cylinders with a common crank shaft and a piston slidable in each cylinder, a connecting rod between each piston and crank offset, said connecting rod comprising an elongated shank and a semi-circular bearing at each end thereof, a pair of partly circular bearing caps engaging said crank offset on the outer ends of said connecting rod bearings, each cap having a pair of downwardly divergent ears, each ear having an opening therethrough with the lower end of each opening communicating with a partly spherical seat, a pair of tie rods connected between each piston and said pair of bearing caps, each tie rod including an elongated shank extending at one end loosely through an ear opening, an eye at the other end of said shank engaging about a piston stud, a partly spherical washer about said shank and engaging said seat, and an adjusting nut threaded on said shank and bearing against said washer.

References Cited in the file of this patent
UNITED STATES PATENTS

| | | |
|---|---|---|
| 369,883 | Richards | Sept. 13, 1887 |
| 746,699 | Hart | Dec. 15, 1903 |